(12) United States Patent
Ge et al.

(10) Patent No.: US 8,954,776 B2
(45) Date of Patent: Feb. 10, 2015

(54) ENERGY-SAVING CIRCUIT FOR MOTHERBOARD

(75) Inventors: Ting Ge, Shenzhen (CN); Ya-Jun Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 364 days.

(21) Appl. No.: 13/570,226

(22) Filed: Aug. 8, 2012

(65) Prior Publication Data

US 2013/0346773 A1 Dec. 26, 2013

(30) Foreign Application Priority Data

Jun. 21, 2012 (CN) .......................... 2012 1 0206756

(51) Int. Cl.
*G06F 1/32* (2006.01)
(52) U.S. Cl.
USPC ............................ 713/324; 713/300; 713/320
(58) Field of Classification Search
CPC ....... G06F 1/32; G06F 1/3206; G06F 1/3225; G06F 1/3253; G06F 1/3287; Y02B 60/1225; Y02B 60/1235; Y02B 60/1285
See application file for complete search history.

(56) References Cited

U.S. PATENT DOCUMENTS

| | | | | |
|---|---|---|---|---|
| 6,498,759 | B2 * | 12/2002 | Chang et al. | 365/226 |
| 8,650,414 | B2 * | 2/2014 | Jayakumar et al. | 713/300 |
| 2008/0266996 | A1 * | 10/2008 | Chen et al. | 365/226 |

* cited by examiner

*Primary Examiner* — Dennis M Butler
(74) *Attorney, Agent, or Firm* — Novak Druce Connolly Bove + Quigg LLP

(57) ABSTRACT

When there is a memory module mounted in a memory slot, a memory power circuit provides a voltage to the memory slot. First and second power pins of the memory slot are connected. A first electronic switch is turned on. A second electronic switch is turned off. A programmable logic controller (PLC) outputs a first control signal to the memory power circuit to output the voltage to the memory slot. When there is no memory module mounted in the memory slot and the motherboard is powered on, the memory power circuit provides a voltage to the memory slot. The first and second power pins of the memory slot are disconnected. The first electronic switch is turned off. The second electronic switch is turned on. The PLC outputs a second control signal to control the memory power circuit not to output the voltage to the memory slot.

4 Claims, 1 Drawing Sheet

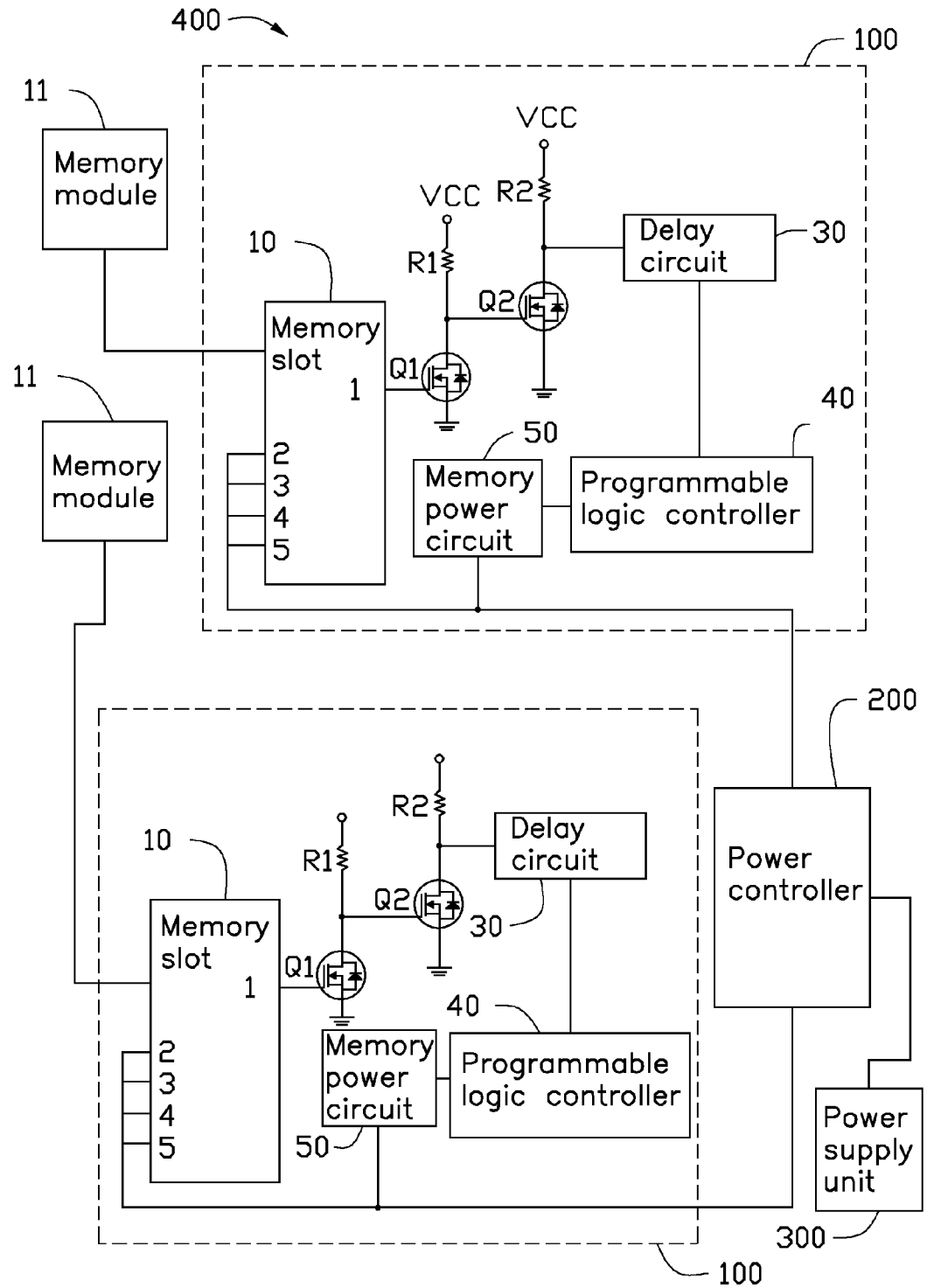

ENERGY-SAVING CIRCUIT FOR MOTHERBOARD

BACKGROUND

1. Technical Field

The present disclosure relates to energy-saving circuits, and particularly to an energy-saving circuit for a motherboard.

2. Description of Related Art

At present, many motherboards each include four memory power circuits for providing voltages to a number of memory slots of the motherboard. However, the memory power circuits may provide voltages even to empty memory slots, which is a waste of energy.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of an energy-saving circuit for a motherboard in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

Referring to the FIGURE, two energy-saving circuits 100 are arranged on a motherboard 400, and connected to a power controller 200. The power controller 200 is connected to a power supply unit 300. Each energy-saving circuit 100 in accordance with an exemplary embodiment includes a memory slot 10, two electronic switches, such as n-channel field effect transistors (FETs) Q1 and Q2, two resistors R1 and R2, a delay circuit 30, a programmable logic controller (PLC) 40, and a memory power circuit 50. The delay circuit 30 is used for receiving a signal and delaying the signal. The delay circuit 30 is known in the art.

The memory slot 10 includes a plurality of power pins (such as power pins 1-5). The power pins 2-5 of the memory slot 10 are connected to the memory power circuit 50, to receive a voltage from the memory power circuit 50 and provide the voltage to a memory module mounted in the memory slot 10. The power pin 1 of the memory slot 10 is connected to a gate of the FET Q1. A source of the FET Q1 is grounded. A drain of the FET Q1 is connected to a gate of the FET Q2. The drain of the FET Q1 is also connected to a power source VCC through the resistor R1. A source of the FET Q2 is grounded. A drain of the FET Q2 is connected to the delay circuit 30 and also connected to the power source VCC through the resistor R2. The PLC 40 is connected to the delay circuit 30 and the memory power circuit 50. The memory power circuit 50 is connected to the power controller 200.

In use, when a memory module 11 is mounted in the memory slot 10 and the motherboard 400 is powered on, the memory power circuit 50 provides a voltage to the memory slot 10. The power pins 1-5 of the memory slot 10 are connected together when the memory module 11 is mounted in the memory slot 10 by the power pins of the memory module 11. The gate of the FET Q1 receives a high level signal from the power pin 1 of the memory slot 10. The drain of the FET Q1 outputs a low level signal to the gate of the FET Q2 and the FET Q2 is turned off. The PLC 40 receives a high level signal from the power source VCC through the delay circuit 30 and outputs a first control signal to the memory power circuit 50, to control the memory power circuit 50 to continuously output voltage to the memory slot 10.

When the memory module 11 is not mounted in the memory slot 10 and the motherboard is powered on, the memory power circuit 50 provides a voltage to the memory slot 10. The power pin 1 of the memory slot 10 is disconnected from the power pins 2-5 of the memory slot 10. The gate of the FET Q1 receives a low level signal and the FET Q1 is turned off. The gate of the FET Q2 receives a high level signal from the power source VCC through the resistor R1 and the FET Q2 is turned on. The PLC 40 receives a low level signal from the drain of the FET Q2 through the delay circuit 30 and outputs a second control signal to the memory power circuit 50, to control the memory power circuit 50 to not output voltage to the memory slot 10, thus saving electrical energy. The power controller 200 detects an output voltage of each memory power circuit 50 and outputs a power control signal to the power supply unit 300 for controlling the power supply unit 300 to be powered off when the power controller 200 does not detect output voltages from any of the memory power circuits 50, to further save electrical energy.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An energy-saving circuit applicable to a motherboard, the energy-saving circuit comprising:
    a first resistor;
    a second resistor;
    a memory slot comprising a first power pin and a plurality of second power pins;
    a first electronic switch comprising a first terminal connected to the first power pin of the memory slot, a second terminal grounded, and a third terminal;
    a second electronic switch comprising a first terminal connected to the third terminal of the first electronic switch and also connected to a power source through the first resistor, a second terminal grounded, and a third terminal connected to the power source through the second resistor;
    a programmable logic controller (PLC) connected to the third terminal of the second electronic switch; and
    a memory power circuit connected to the plurality of second power pins of the memory slot and the PLC, to output a voltage to the memory slot;
    wherein when there is a memory module mounted in the memory slot and the motherboard is powered on, the memory power circuit provides a voltage to the memory slot, the first power pin and the plurality of second power pins are connected together, the first electronic switch is turned on, the second electronic switch is turned off, the PLC outputs a first control signal to the memory power circuit for controlling the memory power circuit to output the voltage to the memory slot; when there is no memory module mounted in the memory slot and the motherboard is powered on, the memory power circuit provides a voltage to the memory slot, the first power pin and the plurality of second power pins are disconnected, the first electronic switch is turned off, the second electronic switch is turned on, the PLC outputs a second control signal to the memory power circuit for controlling the memory power circuit not to output the voltage to the memory slot.

2. The energy-saving circuit of claim 1, further comprising a delay circuit connected between the third terminal of the second electronic switch and the PLC, wherein the delay circuit delays a signal received from the second electronic switch and outputs the delayed signal to the PLC.

3. The energy-saving circuit of claim 1, wherein the first and second electronic switches are n-channel field effect transistors (FETs), the first to third terminals of the first and second electronic switches are respectively gates, sources, and drains of the FETs.

4. The energy-saving circuit of claim 1, wherein the memory power circuit is connected to a power controller of the motherboard, the power controller controls a power supply unit of the motherboard to be powered off when the power controller does not detect an output voltage of the memory power circuit.

\* \* \* \* \*